US005559040A

United States Patent [19]

Jeyendran

[11] Patent Number: 5,559,040

[45] Date of Patent: Sep. 24, 1996

[54] PULSING AND OSCILLATING METHODS OF CENTRIFUGING FOR IMPROVING THE RECOVERY OF VIABLE CELLS

[76] Inventor: Rajasingam S. Jeyendran, 1845 Golden Pond La., Wheaton, Ill. 77024

[21] Appl. No.: 566,670

[22] Filed: Dec. 4, 1995

[51] Int. Cl.[6] .................................... B01D 21/26

[52] U.S. Cl. .................... 436/177; 435/2; 435/308.1; 210/787

[58] Field of Search .................. 435/2, 240.1, 240.2, 435/240.4, 243, 308.1; 436/177; 210/781, 728, 787

[56] References Cited

U.S. PATENT DOCUMENTS

| | | | |
|---|---|---|---|
| 3,664,845 | 5/1972 | Friedman | 99/57 |
| 4,007,087 | 2/1977 | Ericsson | 195/1.8 |
| 4,140,268 | 2/1979 | Lacour . | |
| 4,668,214 | 5/1987 | Reeder | 494/37 |
| 4,927,750 | 5/1990 | Dorn | 435/2 |
| 4,939,087 | 7/1990 | Van Wie et al. | 435/308.1 |
| 5,227,066 | 7/1993 | Ishida et al. | 435/308.1 |
| 5,370,802 | 12/1994 | Brown | 210/782 |

OTHER PUBLICATIONS

Salamon, S. "Deep freezing of boar semen. III. Effects of centrifugation, diluent and dilution rate, pellet volume, and method of thawing on survival of spermatozoa" Chemical Abstracts, vol. 78, Abstract No. 122172p (1973).

Vander Ven et al, "Glass Wool Column Filtration of Human Semen . . . ," Human Reproduction, vol. 3, No. 1, pp. 85–88 (1988).

Rhemrev et al, "Human Sperm Selection by Glass Wool Filtration . . . ," Fertility & Sterility, vol. 51, pp. 685–690 (1989).

Mackler et al, "Improved Techniques for Separating Motile Spermatazoa . . . ," Int. J. Andrology, vol. 7, pp. 71–78 (1984).

Mack et al, "Acrosomal Enzymes and Ultrastructure of Unfrozen and Cryotreated Human Spermatazoa", Gamete Res. vol. 18, pp. 375–389 (1987).

Makler et al, "Effects of Shaking and Centrifugation on Human Sperm Motility," Arch. Andrology, vol. 7, pp. 21–26 (1981).

*Primary Examiner*—Jeffrey Snay

*Attorney, Agent, or Firm*—Tilton, Fallon, Lungmus

[57] ABSTRACT

Pulsing and oscillating methods of centrifuging viable cell samples for improving the quantity and quality of the recovered cells are disclosed. In the pulsing method, the relative centrifugal force applied to the viable cells is pulsed between a predetermined centrifugal force and a negligible or zero centrifugal force by alternately rotating and stopping the centrifuge. The steps of rotating and stopping the centrifuge are alternately repeated until at least three total rotating steps have been completed, preferably for a total rotation time which does not exceed approximately 5 minutes. In the oscillating method, the relative centrifugal force applied to the viable cell samples is oscillated between a relatively high centrifugal force and a relatively low centrifugal force until at least three steps of rotation at the high g force are completed, preferably for a total rotation time which does not exceed approximately 5 minutes. It has been found that the pulsing and oscillating methods yield a significantly higher number of viable cells with better quality than prior art centrifuging methods.

21 Claims, 1 Drawing Sheet

FIG. 1
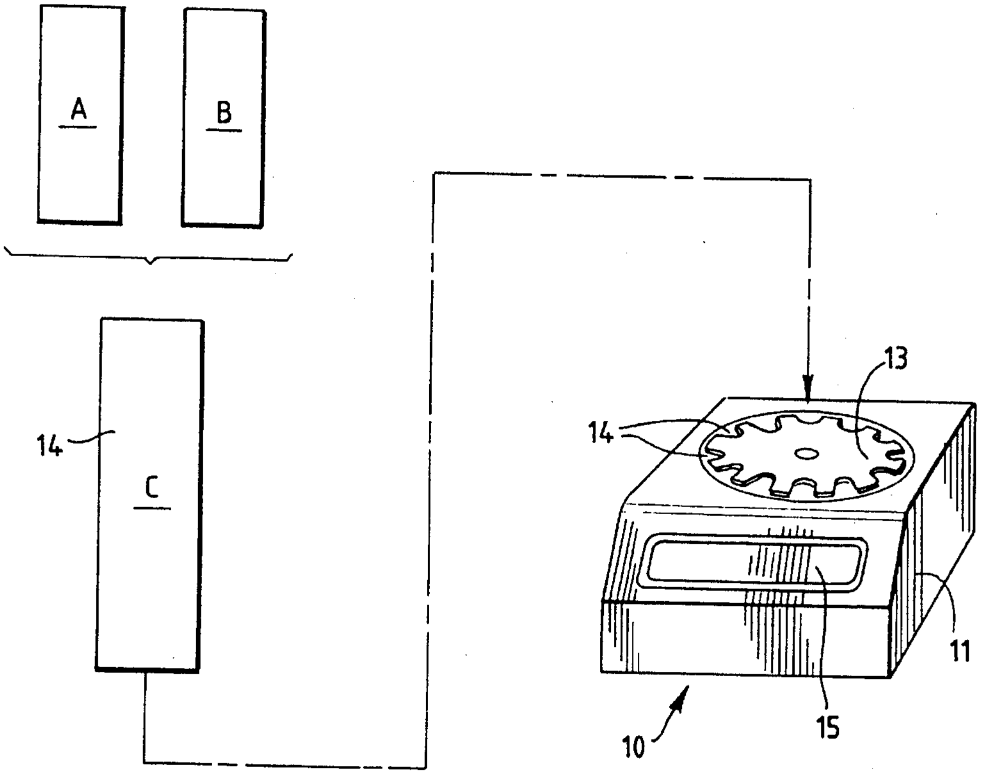
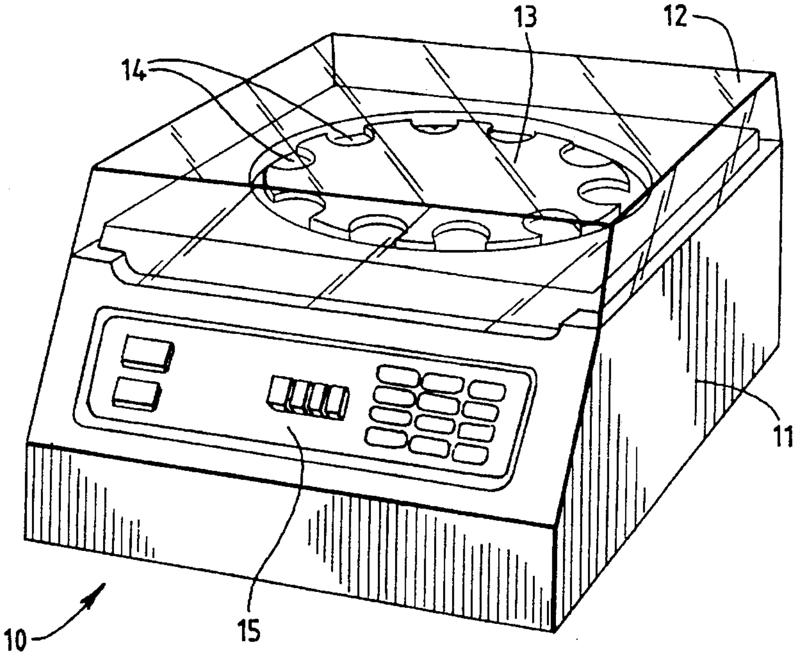
FIG. 2

PULSING AND OSCILLATING METHODS OF CENTRIFUGING FOR IMPROVING THE RECOVERY OF VIABLE CELLS

BACKGROUND AND SUMMARY

Centrifuges are widely used to separate spermatozoa from semen and also for separating other types of viable cells, such as blood cells, bacteria and other microorganisms. There are generally three different types of centrifuges which are broadly classified as low-speed, high-speed and ultra-speed centrifuges. Low-speed centrifuges typically have a maximum rotor speed of less than 10,000 rpm and are used to harvest intact or viable cells. However, it is well known that even low-speed centrifuges can have adverse effects upon the quality of the harvested biological material due to the excessive centrifugal forces exerted upon the material.

Several authors have reported on the particularly poor results which commonly occur in the recovery of spermatozoa from centrifugation. Van der Ven H. H., Jeyendran R. S., Tunnerhoff A., Hoebbel K., Al-Hasani S., Diedrich K., Krebs D., and Perez-Pelaez M., *Glass Wool Column Filtration of Human Semen: Relationship Swim Up Procedure and IVF Outcome,* Human Reprod. 1988; 3:85–8; Rhemrev J., Jeyendran R. S., Vermeiden J. P., and Zaneveld L. J. D., *Human Sperm Selection by Glass Wool Filtration and a Two-Layer Discontinuous Percoll Gradient Centrifugation,* Fertil. Steril. 1989; 51:685–90. It is believed that such poor results are due to the standard practice of continuously centrifuging semen or other samples for a period of time at high centrifugal forces which can adversely effect the quality of the recovered cells. Lower centrifugal forces are sometimes used but require an increase in the centrifugation time in order to achieve an effective rate of sedimentation and a satisfactory concentration of viable cells in the recovered samples. However, increasing the centrifugation time has adverse effect upon the quality of recovered samples similar to the results achieved when applying high centrifugal forces. In fact, the deleterious effects of such centrifugation have been attributed to intracellular and ultrastructural damage to spermatozoa. Makler A., Murillo O., Huszar G., Tarlatzis B., De Cherney A., and Nabtolin F., *Improved Technique for Separating Motile Spermatozoa From Human Semen. II An Autraumatic Centrifugation Method,* Int. J. Androl. 1984; 7:71–8; Mack S. R. and Zaneveld L. J. D., *Acrosomal Enzymes and Ultrastructure of Unfrozen and Cryotreated Human Spermatozoa,* Gamete Res. 1987; 18:375–83; Makler A. and Jakobi P., *Effects of Shaking and Centrifugation on Human Sperm Motility,* Arch. Androl. 1981; 7:21–6. Such adverse effects reduce sperm motility and result in poor quality specimens for analysis and artificial insemination.

In a typical prior art method of centrifuging semen, the semen sample is continuously centrifuged at a constant relative centrifugal force of between 200 and 1000 g for a time period of 5 to 30 minutes. When the g force is high (1000 g), the time period tends to be shorter (5 minutes), and when the g rate is low (200 g), the time period tends to be higher (20 to 30 minutes). In both cases, the prior art methods require either a high centrifugal force or a long centrifugation period in order to achieve an effective rate of sedimentation and to recover a sample having a high sperm concentration. However, since high centrifugal forces and long centrifugation periods are the primary factors which adversely affect viable cells, both methods have adverse effects on the quality of the recovered cells.

An important aspect of this invention therefore lies in the discovery of pulsing and oscillating methods of centrifuging which yield a higher number of viable cells than the prior art methods. The inventive methods employ either pulsing or oscillating the relative centrifugal force applied to the samples to gradually and gently nudge or urge the viable cells towards the bottom of the centrifugation chambers. By either pulsing or oscillating the relative centrifugal force, the inventive methods avoid exerting a continuous centrifugal force on the viable cell samples such as occurs in the prior art methods.

Briefly, the pulsing method comprises first obtaining a sample of viable cells and adding that sample to a biologically compatible medium. The sample and medium are then placed in the chamber of a centrifuge. The chamber is then rotated so that a predetermined centrifugal force is applied to the sample and the rotation of the chamber is then stopped so that the chamber comes to rest. Thereafter, the rotating and stopping steps are alternately repeated until at least three total rotating steps have been performed. Preferably, the total time of the rotating steps does not exceed approximately 5 minutes. The samples are then removed from the centrifuge. It has been found that such a pulsing method yields a significantly higher number of viable cells with higher quality than the prior art centrifuging methods.

During the rotating step, the predetermined centrifugal force applied to the sample is about 200 to 1000 g, preferably about 1000 g. Each rotating step has a time period of approximately 30 seconds to 2 minutes, and each of the stopping steps between the rotating steps also has a time period of approximately 30 seconds to 2 minute. In a preferred embodiment, each of the rotating steps and each of the stopping steps has a time period of approximately 1 minute. The pulsing method may be used to centrifuge a variety of different types of viable cells such as blood cells, various microorganisms, spermatozoa, bacteria, etc.

The oscillating method is similar to the pulsing method except that the centrifuge is not completely stopped. Instead, the centrifugal force applied to the sample is oscillated between a first centrifugal force in one rotating step and a second centrifugal force in a second rotating step. The first centrifugal force is higher than the second centrifugal force and the periods of operation at the lower centrifugal force interrupt the periods of operation at the higher centrifugal force to avoid the continuous application of a high centrifugal force to the viable cell samples. The rotation of the chamber at the first and second centrifugal forces is alternately repeated until at least three total rotating steps at the higher centrifugal force have been completed. Preferably, the total time of rotation of the chamber and samples does not exceed approximately 5 minutes.

During the first and second rotating steps, the first centrifugal force is about 750 to 1000 g and the second centrifugal force is about 200 to 750 g, respectively. In one embodiment, the first centrifugal force was about 1000 g and the second centrifugal force was about 500 g. The time period for operation at the first and second centrifugal forces can vary between a period of 10 seconds and 1 minute and the total time of rotation generally should not exceed approximately 5 minutes. While in some circumstances continued rotation beyond a time period of 5 minutes might result in increased sedimentation of a sample, it is believed more likely that the increased rotation time may damage the viable cells and that is why the preferred rotation time does not exceed approximately 5 minutes. It has been found that such an oscillating method yields a significantly higher number of viable cells with higher quality than the standard centrifugation method of applying a continuous centrifugal force to the viable cell samples.

Other objects, features, and advantages of the present invention will become apparent from the following specification and drawings.

BRIEF DESCRIPTION OF THE DRAWING

FIG. 1 is a schematic and perspective view of depositing a sample in a standard centrifuge.

FIG. 2 is another perspective view of a standard centrifuge.

DETAILED DESCRIPTION OF PREFERRED EMBODIMENTS

Referring to FIG. 1, the numeral 10 generally designates a standard centrifuge. Centrifuge 10 includes a base 11, a cover 12, a rotor 13, a plurality of chambers 14, and drive means (not shown) for rotating the rotor 13. The centrifuge also includes control means for controlling operation and rotation of rotor 13. In the embodiment shown in the drawings, the control means take the form of a standard control panel 15. However, it will be understood that other control means may be operatively connected to the centrifuge for controlling its operation, such as a personal computer or other programmed means.

Centrifuges are well known and are commercially available from many sources. While many centrifuges can be used in practicing the method of this invention, it is preferred that the centrifuge operate on AC current rather than DC current. This is because DC current centrifuges stop almost immediately when the device is turned off, resulting in the application of excessive forces to the samples and the creation of liquid vortexes in the samples which may have adverse effects on the sedimentation of viable cells. In contrast, AC current centrifuges gradually slow when they are turned off and the rotor is allowed to gradually come to rest. One suitable centrifuge is sold under the designation DADE IMMUFUGE II and is commercially available from Baxter Diagnostics, Inc. of Deerfield, Ill. Another suitable centrifuge is sold under the name SPINET and is commercially available from Damon/IEC Division of Needham Heights, Mass. While examples of suitable centrifuges for use in the present invention have been described, it will be understood that other similar centrifuges may also be used.

The method of this invention will generally be described in connection with centrifuging semen to recover spermatozoa. However, it will be understood that the method may also be used for the recovery of many types of viable cells, such as blood cells, microorganisms, bacteria, etc.

The relative centrifugal force exerted by the centrifuge on the sample will generally be referred to herein as g rate, g force, or the designation "g" used in conjunction with a specific numerical value. The g rate or g force represents the relative centrifugal field (rcf) which is calculated by the following formula: $rcf=11.18\times r\ (rpm/1000)^2$, wherein r=radius in cm and rpm=revolutions per minute.

In practicing the methods of this invention, the first step is to obtain a sample of viable cells A and combine that sample with a biologically compatible medium B as shown in FIG. 1. The sample of viable cells may take the form of semen, blood, bacteria suspended in solution or other similar viable cell samples. The biologically compatible medium can be selected from any one of a number of well known centrifuging mediums. One suitable medium for centrifuging semen is sold under the designation Tyrode's salt solution and is available from Sigma Chemical Co. of St. Louis, Mo. However, other well known mediums may also be used. After sample A and medium B are combined in a chamber C, it is then placed in rotor 13 of centrifuge 10. Cover 12 is then closed and control means 15 is then operated in accordance with either the pulsing or oscillating method described below.

The Pulsing Method

The pulsing method first involves rotating the chamber so that a predetermined g force is applied to the sample in chamber 14 of centrifuge 10. The rotation of chamber 14 is then stopped so that the chamber is allowed to come to rest. Thereafter, the steps of rotating and stopping the chamber are alternately repeated until at least three rotating steps have been completed. Preferably, the total time of rotating the chamber does not exceed approximately 5 minutes since longer periods of rotation might damage the cells in the sample (although it is believed that in some circumstances an increased rotation time might be desirable since it might achieve a higher rate of sedimentation). By alternately rotating and stopping the centrifuge, the sample in the chamber of the centrifuge is not subjected to a continuous application of centrifugal force such as in prior art methods.

During the rotating steps, the rotor 13 is rotated so that a predetermined g rate of about 200 to 1000 g, preferably about 1000 g, is applied to the sample. The time period for each rotating step, between the stopping steps, should be relatively short and should fall in a range between approximately 30 seconds and 2 minutes, preferably about 1 minute. By limiting the time period of each rotating step to a relatively short interval, the inventive method avoids subjecting the samples to the application of high centrifugal forces for relatively long and continuous periods of time. In addition, the total time of rotating rotor 13 is preferably minimized and does not exceed approximately 5 minutes.

During the stopping step, the current to the drive means of the AC centrifuge is stopped, and rotor 13 continues to rotate for a short time before coming to rest. The time period for each stopping step should be between about 30 seconds and 2 minutes, preferably about 1 minute. The centrifuge is stopped to interrupt the rotating steps so that a continuous centrifugal force is not applied to the sample for an extended period of time. By interrupting the rotating steps with stopping steps, it is believed that the cells are gradually and gently urged towards the bottom of the centrifuge chambers.

The rotating and stopping steps are alternately repeated until the rotating step has been performed for a total of at least 3 times. It is believed that at least three rotating steps, depending upon the time interval, are necessary to achieve effective sedimentation of the viable cells from the samples in the chambers of the centrifuge. However, it will be understood that the rotating step may be performed a greater number of times, such as between 3 and 8 times, depending upon the time interval of each rotating step. It has been found that centrifuging viable cells in such a pulsing method for a total rotation time of about 5 minutes yields a higher viable cell concentration in the recovered sample than simply centrifuging the sample continuously for about 5 minutes. It has also been found that such a pulsing method yields a higher number of viable cells with higher quality than the prior art methods.

In one embodiment of the pulsing method, semen was combined with a biologically compatible medium and placed in the chamber of a centrifuge. The sample was then rotated at a g rate of 1000 g for a time interval of 2 minutes. The centrifuge was then stopped for one minute and allowed to come to rest. Thereafter, the centrifuge was operated at 1000 g for one minute, stopped for one minute, operated at 1000 g for 1 minute, stopped for 1 minute, and then operated at 1000 g for one minute. The total time of operation at 1000 g equaled approximately 5 minutes. The sample was then removed from the centrifuge. This pulsing method resulted in a greater sperm concentration in the sample, a higher percentage of sperm motility, and a higher percentage of progressive sperm motility than a standard centrifuging method. The pulsing method is described in more detail below in connection with a specific example and comparison test.

Pulsing Example and Comparison Test

Ejaculates after semen analysis were diluted 1:4 (v/v) with biologically compatible medium and divided into two equal first and second samples. The first sample was used as the control and centrifuged at 1000 g for 5 minutes in a Spinet Centrifuge (Damon/IEC Division, Needham Heights, Mass.). The second sample was centrifuged in the same centrifuge but the g rate was pulsed as follows:

| g force | time (Minutes) |
|---|---|
| 1000 g | 2 |
| 1 g | 1 |
| 1000 g | 1 |
| 1 g | 1 |
| 1000 g | 1 |
| 1 g | 1 |
| 1000 g | 1 |

It will be understood that 1 g is equal to the force of gravity and that the centrifuge is stopped when the g force is equal to 1 g.

After the first and second samples were centrifuged according to the foregoing methods, the supernatants from the first and second samples were each carefully decanted and the recovered sperm pellets were resuspended in 1 mL of biologically compatible medium. The sperm concentration, the sperm motility, and progressive sperm motility of the first and second samples were then measured with the following results:

Quality of Sperm Recovered Following Centrifugation

| | Sperm Concentration ($\times 10^6$/Ml) | Sperm Motility (%) | Prog-Sperm Motility (%) |
|---|---|---|---|
| Standard Centrifugation | 35.3 ± 7.2 | 71.0 ± 3.7 | 49.5 ± 3.8 |
| Pulsing Method | 42.6 ± 7.4 | 80.7 ± 2.8 | 59.1 ± 3.5 |

Mean ± SEM value was significantly ($P < 0.002$) higher than the corresponding mean value ($n = 10$).

The above results show that the pulsing method yielded a supernatant having a higher sperm concentration, a higher sperm motility, and a higher progressive sperm motility than the first sample which underwent standard centrifugation.

To further test the first and second samples, the samples were then added to equal volumes of test-yolk, cooled slowly to 5° C. in a water jacket, and then incubated. The sperm cooling and incubation were to stress the sperm and augment any subtle alterations or injuries to the sperm which might have occurred during the centrifugation processes. The motility of the first and second samples were then again measured following 1 to 3 hours and 12 to 24 hour incubations at 5° C. with the following results:

Quality of Sperm Recovered Following Centrifugation and Incubation at 5° C. in TEST-yolk

| | Incubation (hours) | Sperm Motility (%) | Progressive Sperm Motility (%) |
|---|---|---|---|
| Standard Centrifugation | 1–3 | 57.4 ± 5.3 | 36.7 ± 5.1 |
| Pulsing Centrifugation | 1–3 | 71.5 ± 5.0 | 52.5 ± 4.6 |
| Standard Centrifugation | 12–24 | 32.8 ± 3.1 | |
| Pulsing Centrifugation | 12–24 | 47.7 ± 5.0 | |

Mean ± SEM value was significantly ($P < 0.01$) higher than the corresponding mean value ($n = 10$).

The above results show that the pulsing method yielded a significantly higher number of viable spermatozoa with higher quality than the standard centrifugation method.

The Oscillating Method

The oscillating method is similar to the pulsing method except that the centrifuge is not completely stopped or allowed to come to rest. Rather, the centrifugal force exerted by the centrifuge on the sample is oscillated between a first g rate and a second g rate for at least three rotating steps at each of the first and second g rates. Preferably, the total time period of rotation does not exceed approximately 5 minutes. The first g rate is higher than the second g rate and the periods of operation at the low g rate interrupt the periods of operation at the high g rate so that the high g rate is not continuously applied to the sample, which could have adverse effects upon the samples.

During rotation at the first g rate, the centrifuge is operated at a high g rate of about 750 to 1000 g, preferably about 1000 g. The time period for the first rotating step can vary between 10 seconds and 1 minute.

During rotation at the second g rate, the centrifuge is operated at a lower g rate of about 200 to 750 g, preferably about 500 g when the first g rate is about 1000 g. Similar to the first rotating step, the second rotating step may be performed for time periods ranging between 10 seconds and 1 minute. Preferably, the total rotation time of both steps does not exceed approximately 5 minutes.

In one specific embodiment, a sample of semen was combined with the biologically compatible medium and placed in the chamber of the centrifuge. The centrifuge was then operated so that the g force applied to the sample oscillated or alternated between a high rate of 1000 g and a low rate of 500 g. The time periods of operation at the high and low rates varied between 10 and 50 seconds, and the total rotation time equaled approximately 5 minutes. The sample was then removed from the centrifuge. It has been found that such an oscillating method results in the recovery of a sample having a higher sperm concentration and sperm motility than standard centrifugation. The oscillating method is more fully described below in connection with a specific example and comparison test.

Oscillating Example and Comparison Test

Ejaculates after semen analysis were diluted 1:4 (v/v) with medium and divided into two equal, first and second samples. The first sample was used as the control and centrifuged at 500 g for 10 minutes in a Dade Immufuge II Centrifuge (Baxter Diagnostics, Deerfield, Ill.). The second sample was centrifuged in the same centrifuge, but only for 5 minutes with the g force oscillated as follows:

| g force | time (sec) |
|---|---|
| 1000 g | 30 |
| 500 g | 30 |
| 1000 g | 20 |
| 500 g | 40 |
| 1000 g | 15 |
| 500 g | 45 |
| 1000 g | 10 |
| 500 g | 50 |
| 1000 g | 10 |
| 500 g | 50 |

Time for 1000 g = 85 sec
Time for 500 g = 215 sec
Total time = 300 sec (5 min)

The first and second samples were then carefully decanted and resuspended in 1 mL of medium. The sperm concentration and sperm motility of the two samples were then measured with the following results:

Quality of Sperm Recovered Following Centrifugation

| | Sperm Concentration | Sperm Motility |
|---|---|---|
| Standard Centrifugation | 31.9 ± 3.7 | 77.6 ± 1.8 |
| Oscillating Centrifugation | 41.4 ± 6.2[a] | 83.7 ± 1.8 |

Mean ± SEM value with a superscript was significantly ($P < 0.05$) higher than the corresponding mean value (n = 11).

The above test results show that the oscillating method yielded a significantly higher number of viable spermatozoa with a significantly higher motility than the standard centrifugation method. Importantly, these results were achieved in significantly less time than the standard centrifugation method which produced a sample having a lower sperm concentration. Such a reduction in processing time is a significant benefit when large numbers of samples must be processed, such as in hospitals, fertility clinics, etc.

While in the foregoing, embodiments of the present invention have been described in considerable detail for purposes of illustration, it will be understood by those skilled in the art that many of these details may be varied within the spirit and scope of the invention.

I claim:

1. A pulsing method of centrifuging samples for improving the recovery of viable cells, said method comprising the steps of:

obtaining a sample of viable cells and adding said sample to a biologically compatible medium;

depositing said sample and said medium in a chamber of a centrifuge;

rotating said chamber so that a predetermined g force is applied to said sample;

then, stopping said rotation of said chamber and allowing said chamber to come to rest;

then, alternately repeating said rotating and stopping steps until at least three total rotating steps have been completed; and thereafter, removing said sample from said centrifuge.

2. The method of claim 1 in which said predetermined g force is about 200 to 1000 g.

3. The method of claim 1 in which said predetermined g force is about 1000 g.

4. The method of claim 1 in which said centrifuge is operated on AC current.

5. The method of claim 1 in which said sample is blood.

6. The method of claim 1 in which each of said rotating steps comprises rotating said chamber for a first time period of approximately 30 seconds to 2 minutes and each of said stopping steps comprises allowing said chamber to come to rest for a second time period of about 30 seconds to 2 minutes.

7. The method of claim 6 in which said first time period is about 1 minute and said second time period is about 1 minute.

8. The method of claim 6 in which a total time of said rotating steps does not exceed approximately 5 minutes.

9. The method of claim 1 in which said sample includes a microorganism.

10. The method of claim 9 in which said microorganism is spermatozoa.

11. The method of claim 9 in which said microorganism is a bacteria.

12. An oscillating method of centrifuging samples for improving the recovery of viable cells, said method comprising the steps of:

obtaining a sample of viable cells and adding said sample to a biologically compatible medium;

depositing said sample and said medium in a chamber of a centrifuge;

rotating said chamber so that a first g force is applied to said sample;

then, rotating said chamber so that a second g force which is lower than said first g force is applied to said sample;

then, alternately repeating said rotation of said chamber at said first and second g forces until at least three total rotating steps at said first g force have been completed; and thereafter, removing said sample from said centrifuge.

13. The method of claim 12 in which said centrifuge operates on AC current.

14. The method of claim 12 in which said sample is blood.

15. The method of claim 12 in which said first g force is about 750 to 1000 g and said second g force is about 200 to 750 g.

16. The method of claim 15 in which said first g force is about 1000 g and said second g force is about 500 g.

17. The method of claim 12 in which said steps of rotating said chamber comprise alternately applying said first g force for a time period of about 10 seconds to 1 minute and then applying said second g force for a time period of about 10 seconds to 1 minute.

18. The method of claim 17 in which a total time of said rotation of said chamber does not exceed approximately 5 minutes.

19. The method of claim 12 in which said sample includes a microorganism.

20. The method of claim 19 in which said microorganism is spermatozoa.

21. The method of claim 19 in which said microorganism is a bacteria.

* * * * *